US007980989B2

(12) United States Patent
Oswald et al.

(10) Patent No.: US 7,980,989 B2
(45) Date of Patent: Jul. 19, 2011

(54) DOUBLE CLUTCH OF A DOUBLE CLUTCH TRANSMISSION

(75) Inventors: Johann Oswald, Eschenlohe (DE); Filip De Maziere, Heusden (BE); Didier Genouw, Eernegem (BE); Hendrik Pecceu, Loppem (BE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 33 days.

(21) Appl. No.: 12/509,232

(22) Filed: Jul. 24, 2009

(65) Prior Publication Data
US 2010/0180704 A1    Jul. 22, 2010

Related U.S. Application Data

(63) Continuation of application No. PCT/EP2008/000643, filed on Jan. 28, 2008.

(30) Foreign Application Priority Data

Jan. 26, 2007    (EP) ..................................... 07001762

(51) Int. Cl.
*F16D 25/0638*    (2006.01)
(52) U.S. Cl. ......................... 475/340; 192/83; 192/85.24
(58) Field of Classification Search .................... 192/83, 192/85.19, 85.24; 475/330, 340
See application file for complete search history.

(56) References Cited

U.S. PATENT DOCUMENTS

| 4,463,621 | A | * | 8/1984 | Fisher .............................. 74/330 |
| 6,059,682 | A | | 5/2000 | Friedmann et al. |
| 7,147,092 | B2 | * | 12/2006 | Friedmann ................. 192/48.91 |
| 7,287,443 | B2 | * | 10/2007 | Kuhstrebe et al. .............. 74/335 |
| 7,748,504 | B2 | * | 7/2010 | Ishii et al. ..................... 188/71.5 |

FOREIGN PATENT DOCUMENTS

| DE | 4136040 | 1/1993 |
| DE | 20320467 | 9/2004 |
| FR | 2759132 | 8/1998 |
| WO | 03106868 | 12/2003 |

OTHER PUBLICATIONS

Search Report dated May 14, 2008, for International Application PCT/EP2008/000643.

* cited by examiner

*Primary Examiner* — Ha D. Ho
(74) *Attorney, Agent, or Firm* — Tarolli, Sundheim, Covell & Tummino LLP

(57) ABSTRACT

A double clutch of a double clutch transmission is described and illustrated, and can include an inner clutch which is connected to an inner shaft and has an inner disk carrier for inner disks; an outer clutch which is connected to a hollow shaft arranged co-axially with respect to the inner shaft and has an outer disk carrier for outer disks; and a drive member arranged on a drive shaft and having inner and outer drive disks which can be operatively connected to the inner or outer disks and which form an inner clutch pack or an outer clutch pack together with the disks; wherein a common disk carrier for both clutch packs is attached to the drive member; the disk carrier includes two hubs associated with the clutch packs and engaged within one another; and each hub comprises a plurality of teeth.

22 Claims, 2 Drawing Sheets

DOUBLE CLUTCH OF A DOUBLE CLUTCH TRANSMISSION

CROSS-REFERENCE TO RELATED APPLICATIONS

This is a continuation application of and claims priority to PCT Application No. PCT/EP2008/000643 filed on Jan. 28, 2008. Priority is also claimed to European Patent App. No. 07001762.9 filed on Jan. 26, 2007. The entire contents of both prior-filed patent applications are incorporated herein by reference.

FIELD OF THE INVENTION

The present invention relates to a double clutch of a double clutch transmission.

BACKGROUND

Double clutch transmissions are currently increasingly used in motor vehicle construction, due to their numerous advantages. A key member of this type of transmission is the wet running or dry running double clutch, which respectively transmits engine torque to one of two partial transmissions. While one clutch is closed, the other one is opened. The gear speed is then shifted on the transmission shaft of the opened clutch. In case the opened clutch produces large drag moments in this context, these moments have to be overcome during synchronization of the gear speeds, in addition to the inertia of the transmission shafts. In practice, this means either a decrease of the service life of the synchronizing units or, usually, the use of more efficient and thus more expensive synchronizer rings. Simultaneously, the large drag moments contribute to an increased fuel consumption of the vehicle. The drag moments mainly result from the fact that both clutches have to be lubricated together during operation. Liquid friction between the clutch disks causes these moments.

It is therefore an object underlying some embodiments of the present invention to provide a double clutch of a double clutch transmission which enables a separated lubrication of its clutches, and is simultaneously structured in a space-saving coaxial or nested design with clutches disposed within one another.

SUMMARY

An object of the present invention is solved by using a common disk carrier for both clutch packs, which is characterized in that two hubs with teeth for the disk packs are engaged with one another. Consequently, axial slots are formed between the teeth of the two hubs.

If these slots or cavities are covered axially on one side, preferably with corresponding metal sheets, oil may be supplied and discharged separately to and from the two individual clutches. For this purpose, specially distributed holes are preferably punched into the toothwork of the hubs, which supply the oil from one side of the complete clutch, e.g. the outer clutch, and discharge the oil of the inner clutch toward the other side of the complete clutch. Preferably, the oil for both clutches is supplied separately, and is supplied separately in the clutch toward the individual clutches. This can be effected by corresponding metal sheets in the clutch housing.

BRIEF DESCRIPTION OF THE DRAWINGS

Further details, advantages and features of the present invention are provided in the following description of embodiments with reference to the drawings, in which.

DETAILED DESCRIPTION

Figure 1:
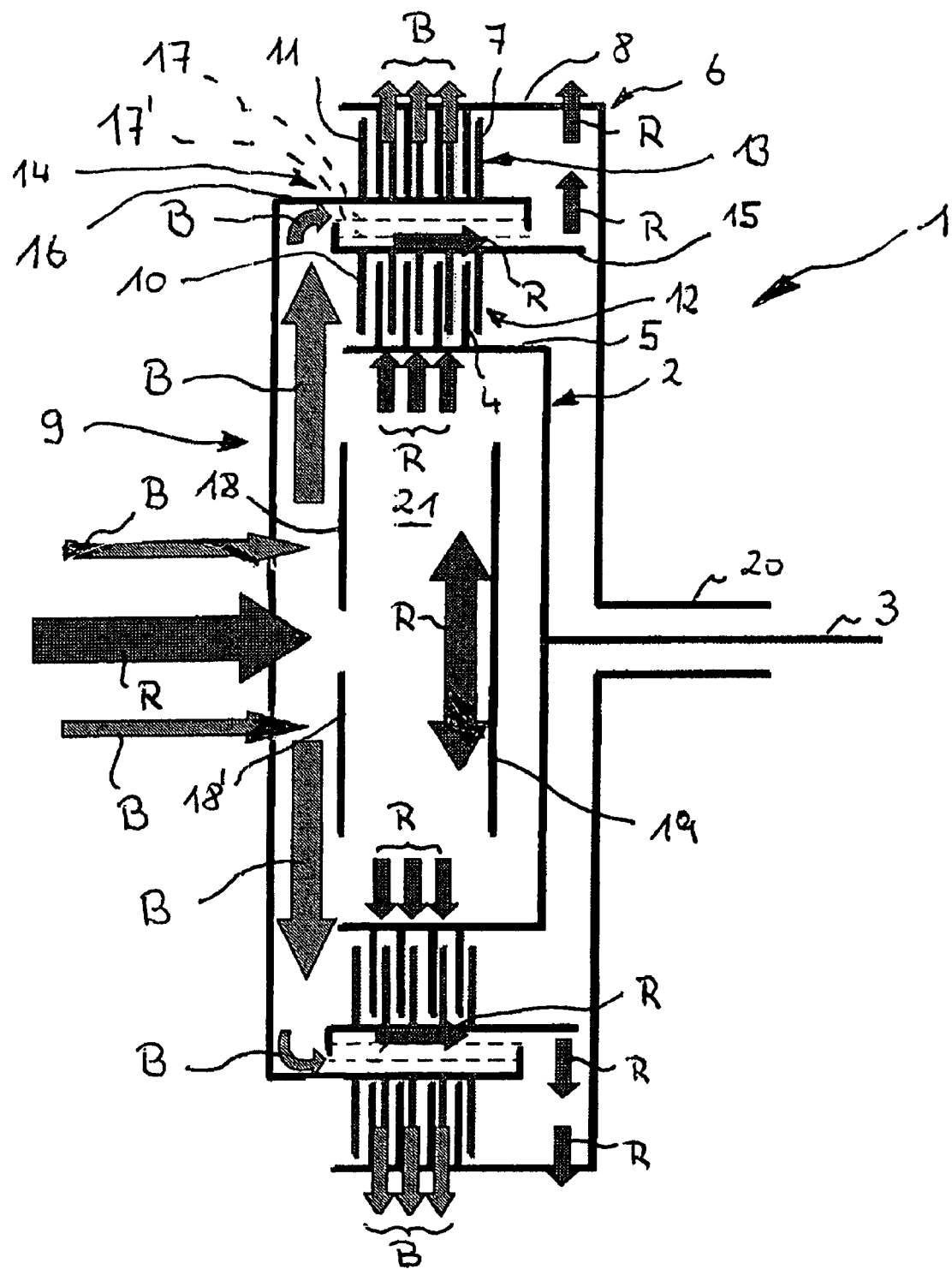
FIG. 1 shows a simplified schematic illustration of the principle of the structure of a double clutch (e.g., a wet double clutch) according to an embodiment of the present invention.

FIG. 1 shows, in a simplified and schematic form, an inventive double clutch 1 of a double clutch transmission, the double clutch transmission not being shown in detail in FIG. 1 in order to simplify the present description.

The double clutch 1 shown in FIG. 1 comprises an inner clutch 2 which is connected to an inner shaft 3. The inner clutch 2 comprises a disk or plate carrier 5 which is provided with inner disks or plates, wherein in the embodiment shown in FIG. 1, one of four inner disks is designated with reference numeral 4 as an example.

The double clutch 1 further comprises an outer clutch 6 which is connected to an outer hollow shaft 20 in which the inner shaft 3 extends axially, as is shown schematically in FIG. 1. The inner clutch 2 is nested within the outer clutch 3. The outer clutch 6, which is connected the outer shaft 20, comprises an outer disk or plate carrier 8 provided with outer disks or plates, wherein in the embodiment shown in FIG. 1, four outer disks 7 are provided as an example.

Further, the double clutch 1 comprises a drive member 9 which is arranged on a drive shaft (not shown in detail). The drive member 9 comprises inner and outer drive disks, wherein the illustrated example provides five outer drive disks and five inner drive disks, one outer drive disk being designated with reference numeral 11 and one of the inner drive disks being designated with reference numeral 10 in FIG. 1, (representative for all drive disks).

Figure 2:
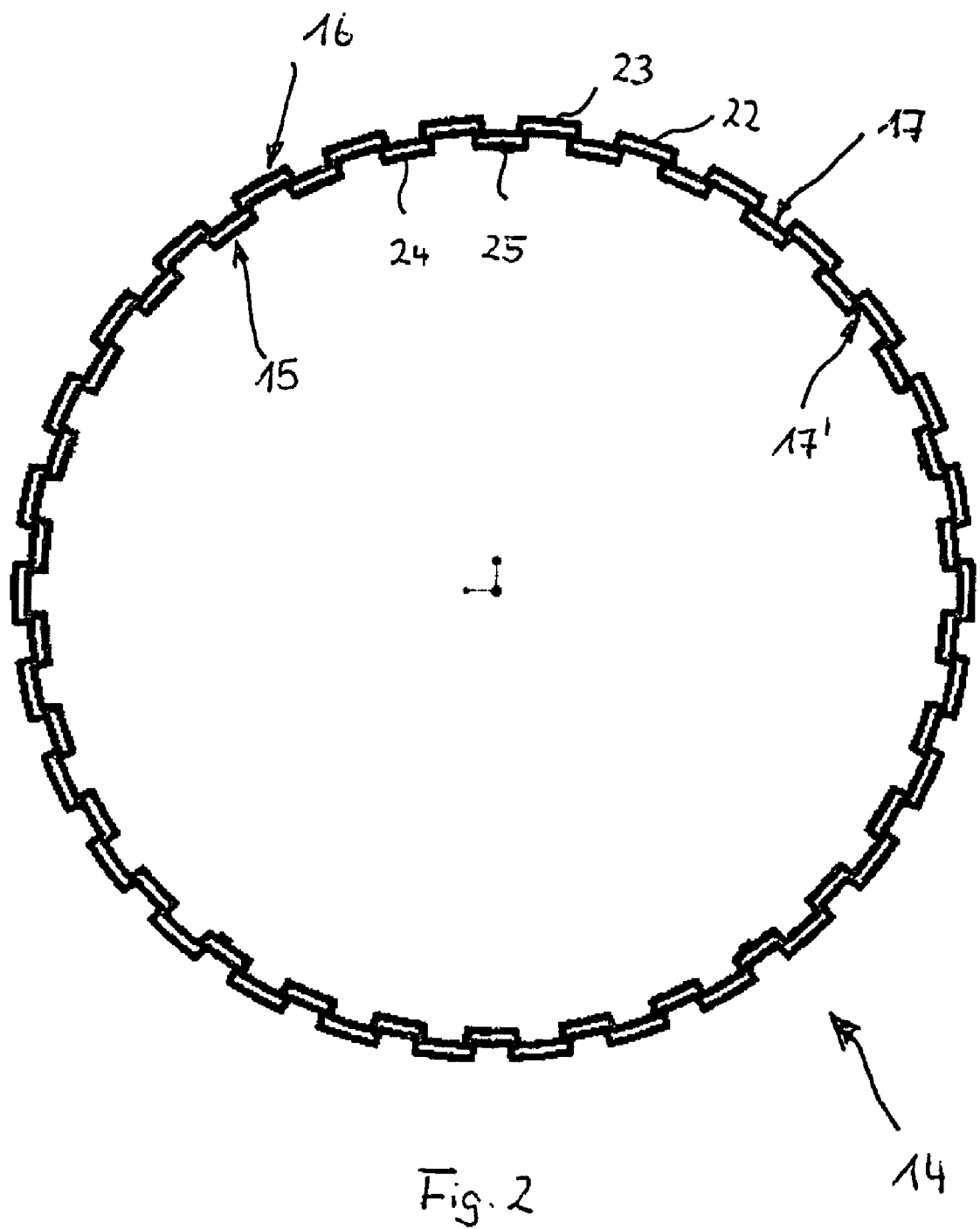
FIG. 2 shows a simplified illustration of two hubs of disk carriers engaged with one another, and including tooth cavities.

FIG. 1 clearly shows that the inner and outer drive disks 10 or 11 are arranged on or attached to one single disk carrier or disk cage 14 which is arranged between the inner and outer disk carriers 5 or 8. The disk cage 14 is made up of two hubs 15, 16 being engaged with one another, said hubs being provided with associated teeth 17 or 17' (see FIG. 2).

The thick arrows B, R in FIG. 1 illustrate two oil flows for the clutches 2 and 6. The oil B for the outer clutch 6 enters the housing interior 21 through the clutch hub, is re-directed to the outside through guide plates 18 and 18' and then enters (from the left in FIG. 1) into upper tooth cavities 22, 23 (see FIG. 2), from which point it is distributed through holes (not shown) punched into the toothwork into a disk pack 13 defined by outer disks/plates 7, 11. After passing same, it is discharged from the outer clutch 6 in the usual manner through holes in the outer disk carrier 8.

The oil flow R for the inner clutch 2 enters the housing interior 21 of the clutch through other boreholes in the hub of the clutch that are axially offset from the oil B, and is thus separately controllable. The oil flow R is distributed via a guide plate 19 and is thus supplied to the inner hub of the inner clutch 2. The oil flow R passes through holes in the inner disk carrier 5, and thus lubricates the inner disk pack 12 defined by the inner disks/plates 4, 10. From the disk pack 12, the oil flow R then enters lower tooth cavities 24, 25 (see FIG. 2) through boreholes in the outer disk carrier 8, and is then discharged axially (right in FIG. 1) from the disk carrier 8, to finally leave the clutch through holes after passing through the outer disk carrier 8 of the outer clutch 6. The guide plates 18, 18', 19 do not have to be separate components. Instead, they may be formed by other components of the clutch by means of a suitable corresponding shaping.

With this arrangement, it is possible to supply both clutches 2, 6 with oil separately. Therewith, each of the clutches 2, 6 can be made completely oil-free, if required. Also, some embodiments of the present invention can reduce drag moments that would otherwise be experienced by the double clutch 1. Further, the principles of the present invention can result in a very simple double clutch structure with few additional components, a very modular design (if required) in which the double clutch can be adapted to conventional lubrication without significant additional construction, and/or a significant savings of space.

It should be noted that the principles of the present invention apply equally to wet or dry running double clutches.

What is claimed is:

1. A double clutch of a double clutch transmission, comprising:
    an inner clutch connected to an inner shaft and comprising an inner disk carrier for inner disks;
    an outer clutch connected to a hollow shaft arranged co-axially with respect to the inner shaft and comprising an outer disk carrier for outer disks;
    a drive member arranged on a drive shaft and comprising inner and outer drive disks which can be operatively connected to the inner or outer disks and which, together with the inner and outer disks, form an inner clutch pack and an outer clutch pack; and
    a common disk carrier for both clutch packs coupled to the drive member, the common disk carrier comprising two hubs engaged with one another, said hubs being associated with the clutch packs, wherein each hub comprises a plurality of teeth;
    wherein oil supply for the outer clutch passes through upper tooth cavities, and oil discharge of the inner clutch passes through lower tooth cavities; and
    wherein oil supply for the outer clutch also passes through lower tooth cavities, and oil discharge of the inner clutch also passes through upper tooth cavities.

2. The double clutch of claim 1, wherein the teeth of the hubs are engaged with one another free of play, and wherein cavities formed between the teeth of the hubs are axially covered on one side.

3. The double clutch of claim 1, wherein the hubs include a plurality of apertures distributed among the teeth.

4. The double clutch of claim 1, further comprising a clutch housing and at least one guide plate within an interior of the clutch housing for distributing oil flow in the interior of the clutch housing.

5. The double clutch of claim 1, wherein
    one of the hubs of the common disk carrier is an inner hub and the other of the hubs of the common disk carrier is an outer hub,
        the inner hub receives drive disks for the inner clutch at an interior area of the inner hub, and engages within and is axially fixed to the outer hub; and
        the outer hub is coupled to the drive member and receives drive disks for the outer clutch at an exterior area of the outer hub.

6. The double clutch of claim 1, wherein:
    one of the hubs of the common disk carrier is an inner hub and the other of the hubs of the common disk carrier is an outer hub,
    the outer hub receives drive disks for the outer clutch at an exterior area of the outer hub, and is axially fixed to the inner hub and engages an exterior of the inner hub; and
    the inner hub is coupled to the drive member and receives drive disks for the inner clutch at an interior area of the inner hub.

7. The double clutch of claim 1, wherein the two hubs of the common disk carrier are coupled to the drive member.

8. The double clutch of claim 2, further comprising a clutch housing and at least one guide plate within an interior of the clutch housing for distributing oil flow in the interior of the clutch housing.

9. The double clutch of claim 3, further comprising a clutch housing and at least one guide plate within an interior of the clutch housing for distributing oil flow in the interior of the clutch housing.

10. The double clutch of claim 2, wherein
    one of the hubs of the common disk carrier is an inner hub and the other of the hubs of the common disk carrier is an outer hub,
    the inner hub receives drive disks for the inner clutch at an interior area of the inner hub, and engages within and is axially fixed to the outer hub; and
    the outer hub is coupled to the drive member and receives drive disks for the outer clutch at an exterior area of the outer hub.

11. The double clutch of claim 3, wherein
    one of the hubs of the common disk carrier is an inner hub and the other of the hubs of the common disk carrier is an outer hub,
    the inner hub receives drive disks for the inner clutch at an interior area of the inner hub, and engages within and is axially fixed to the outer hub; and
    the outer hub is coupled to the drive member and receives drive disks for the outer clutch at an exterior area of the outer hub.

12. The double clutch of claim 4, wherein
    one of the hubs of the common disk carrier is an inner hub and the other of the hubs of the common disk carrier is an outer hub,
        the inner hub receives drive disks for the inner clutch at an interior area of the inner hub, and engages within and is axially fixed to the outer hub; and
        the outer hub is coupled to the drive member and receives drive disks for the outer clutch at an exterior area of the outer hub.

13. The double clutch of claim 1, wherein
    one of the hubs of the common disk carrier is an inner hub and the other of the hubs of the common disk carrier is an outer hub,
    the inner hub receives drive disks for the inner clutch at an interior area of the inner hub, and engages within and is axially fixed to the outer hub; and
    the outer hub is coupled to the drive member and receives drive disks for the outer clutch at an exterior area of the outer hub.

14. The double clutch of claim 2, wherein:
    one of the hubs of the common disk carrier is an inner hub and the other of the hubs of the common disk carrier is an outer hub,
    the outer hub receives drive disks for the outer clutch at an exterior area of the outer hub, and is axially fixed to the inner hub and engages an exterior of the inner hub; and
    the inner hub is coupled to the drive member and receives drive disks for the inner clutch at an interior area of the inner hub.

15. The double clutch of claim 3, wherein:
    one of the hubs of the common disk carrier is an inner hub and the other of the hubs of the common disk carrier is an outer hub, the outer hub receives drive disks for the outer clutch at an exterior area of the outer hub, and is axially fixed to the inner hub and engages an exterior of the inner hub; and the inner hub is coupled to the drive member and receives drive disks for the inner clutch at an interior area of the inner hub.

16. The double clutch of claim 4, wherein:

one of the hubs of the common disk carrier is an inner hub and the other of the hubs of the common disk carrier is an outer hub, the outer hub receives drive disks for the outer clutch at an exterior area of the outer hub, and is axially fixed to the inner hub and engages an exterior of the inner hub; and the inner hub is coupled to the drive member and receives drive disks for the inner clutch at an interior area of the inner hub.

17. The double clutch of claim 1, wherein:

one of the hubs of the common disk carrier is an inner hub and the other of the hubs of the common disk carrier is an outer hub, the outer hub receives drive disks for the outer clutch at an exterior area of the outer hub, and is axially fixed to the inner hub and engages an exterior of the inner hub; and the inner hub is coupled to the drive member and receives drive disks for the inner clutch at an interior area of the inner hub.

18. The double clutch of claim 2, wherein the two hubs of the disk carrier are coupled to the drive member.

19. The double clutch of claim 3, wherein the two hubs of the disk carrier are coupled to the drive member.

20. A double clutch of a double clutch transmission, comprising:

in inner clutch connected to an inner shaft and comprises an inner disk carrier for inner disks;

an outer clutch connected to a hollow shaft being arranged co-axially with respect to the inner shaft and comprising an outer disk carrier for outer disks;

a drive member arranged on a drive shaft and comprises inner and outer drive disks which can be operatively connected to the inner or outer disks and which, together with the disks, form an inner clutch pack and an outer clutch pack; and a common disk carrier for the inner and outer clutch packs attached to the drive member, the common disk carrier comprising two hubs engaged with one another, the hubs being associated with the inner and outer clutch packs, each hub comprising a plurality of teeth;

wherein the teeth are engaged with one another free of play, upper and lower tooth cavities formed between the teeth being covered axially preferably on one side; and wherein the oil supply for the outer clutch passes through the upper tooth cavities and the oil discharge of the inner clutch passes through the lower tooth cavities.

21. A double clutch of a double clutch transmission, comprising:

in inner clutch connected to an inner shaft and comprises an inner disk carrier for inner disks;

an outer clutch connected to a hollow shaft being arranged co-axially with respect to the inner shaft and comprising an outer disk carrier for outer disks;

a drive member arranged on a drive shaft and comprises inner and outer drive disks which can be operatively connected to the inner or outer disks and which, together with the disks, form an inner clutch pack and an outer clutch pack; and a common disk carrier for the inner and outer clutch packs attached to the drive member, the common disk carrier comprising two hubs engaged with one another, the hubs being associated with the inner and outer clutch packs, each hub comprising a plurality of teeth, the hubs comprising upper and lower tooth cavities distributed among the teeth;

wherein the oil supply for the outer clutch passes through the lower tooth cavities and the oil discharge of the inner clutch passes through the upper tooth cavities.

22. The double clutch of claim 21, wherein the upper tooth cavities are distributed among the teeth in the hub associated with the inner clutch pack, and the lower tooth cavities are distributed among the teeth in the hub associated with the outer clutch pack.

* * * * *